Figure 1:
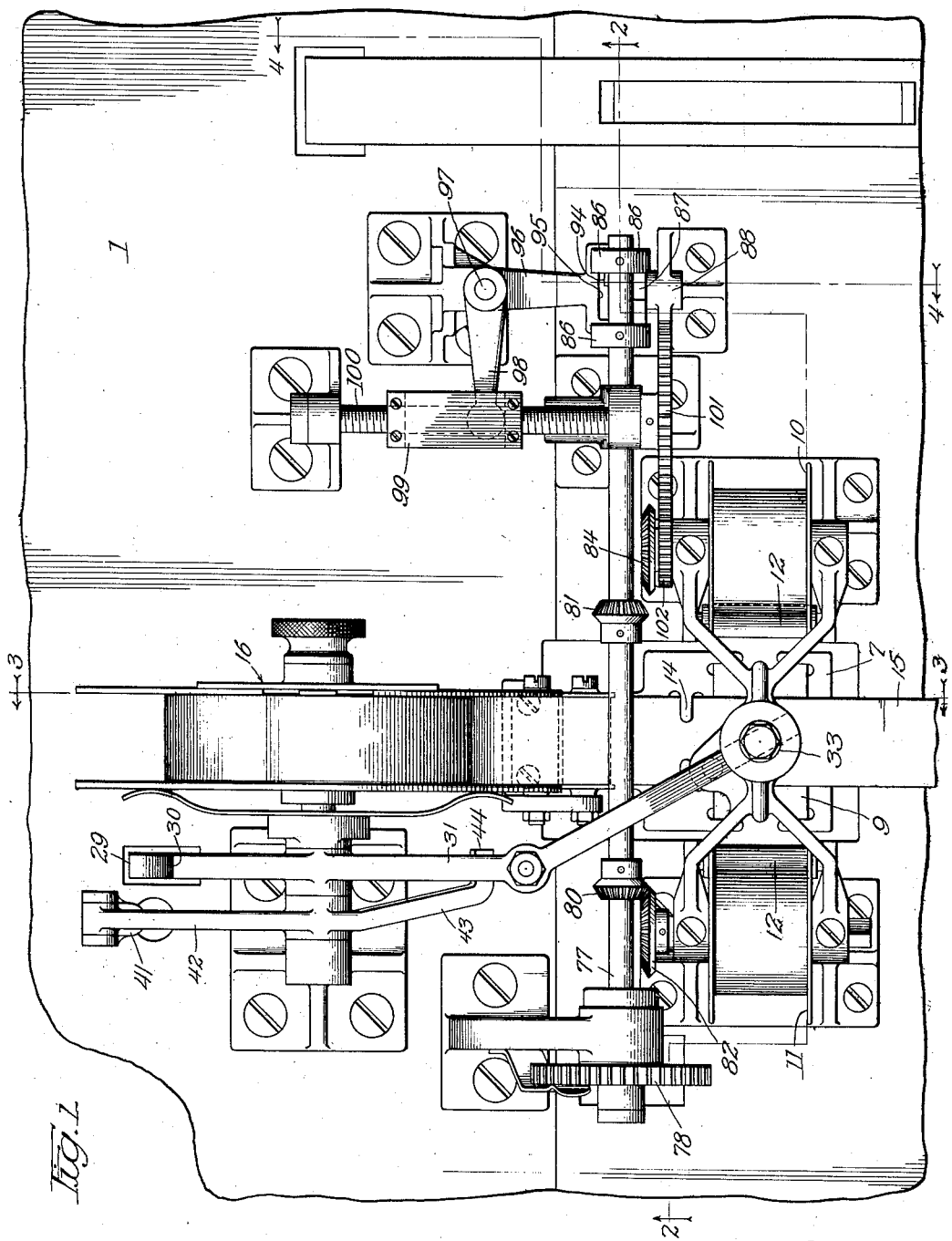
Figure 2:
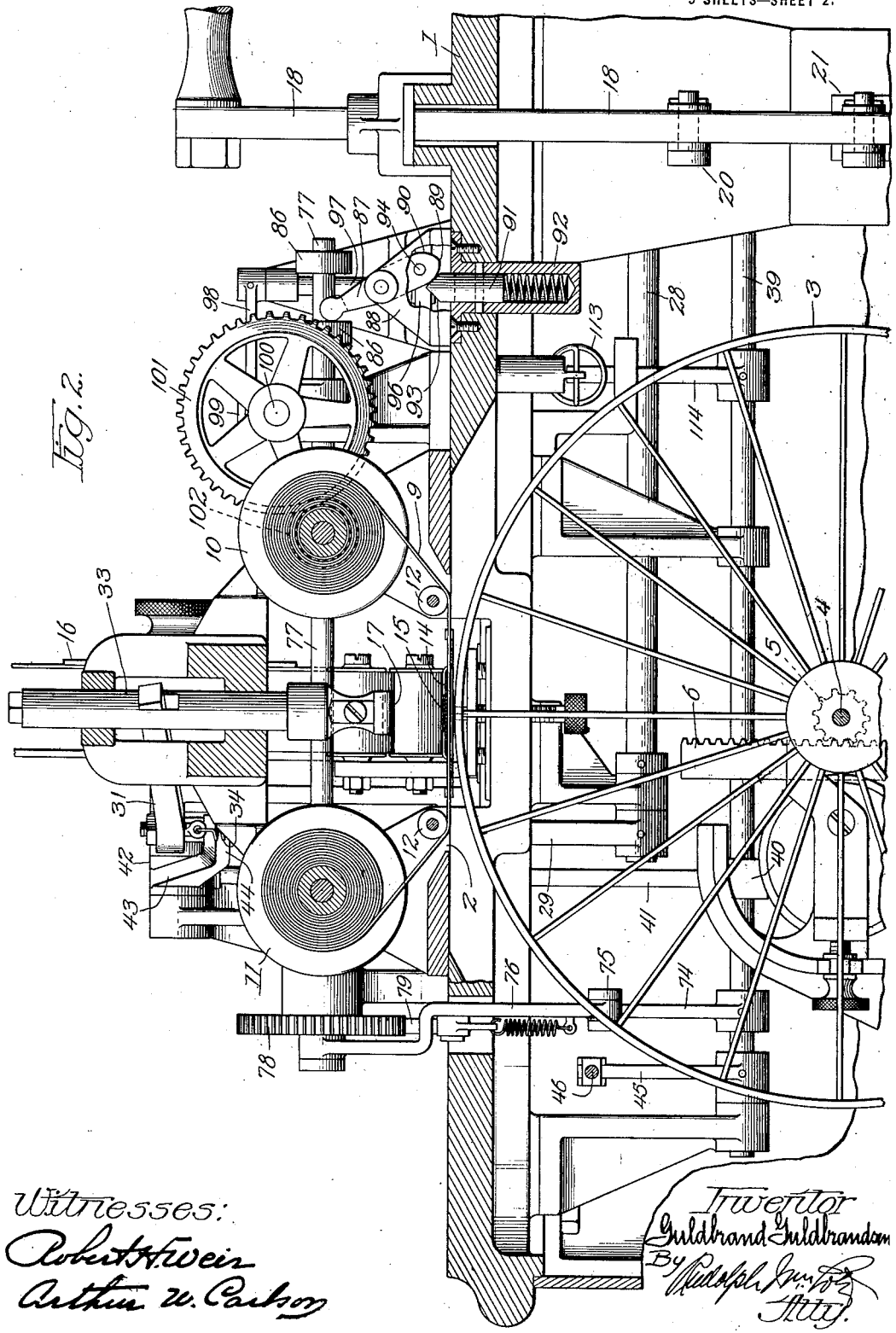
Figure 3:
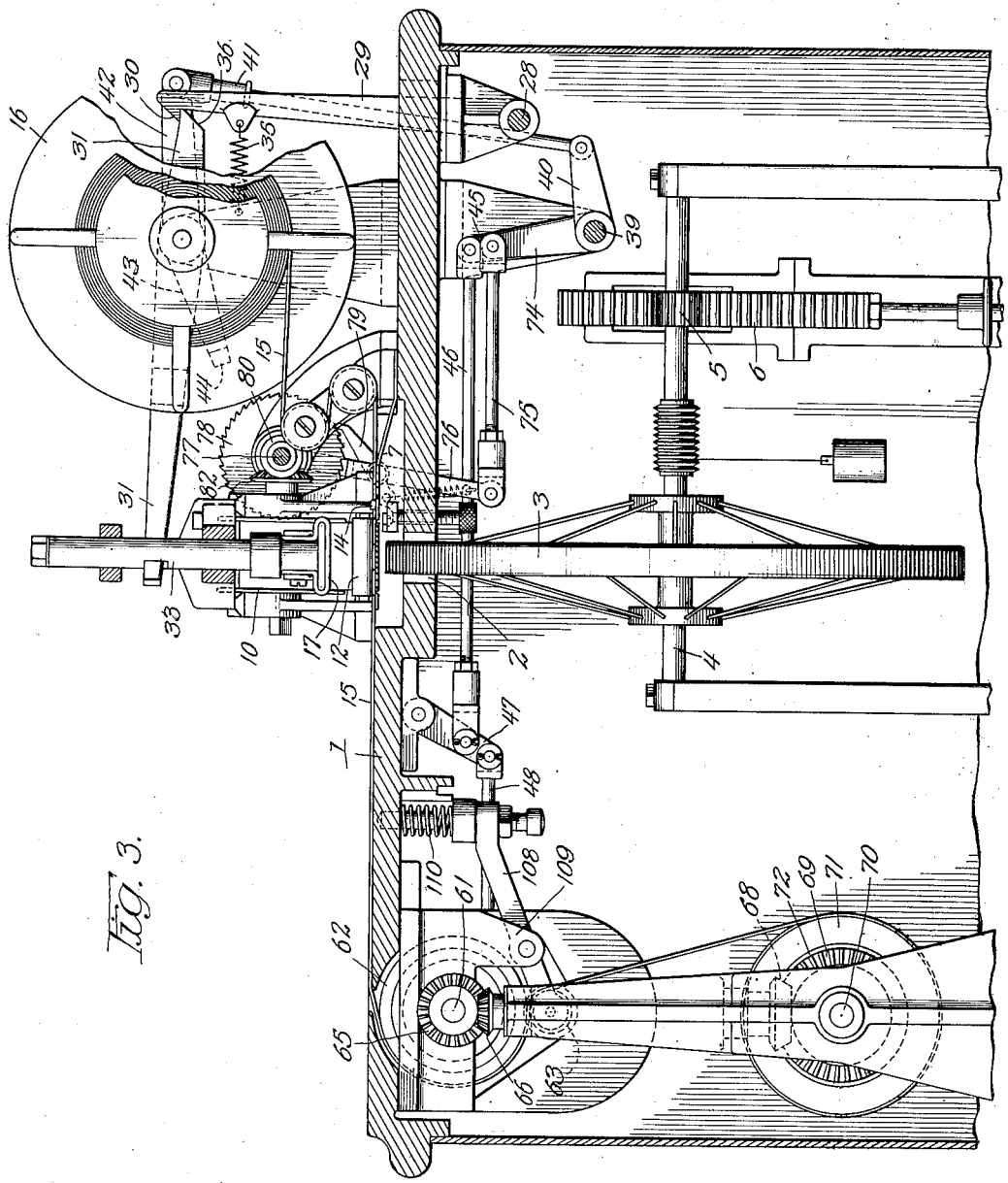

G. GULDBRANDSEN.
WEIGHING AND RECORDING SCALE.
APPLICATION FILED DEC. 14, 1916.

1,319,217.

Patented Oct. 21, 1919.
5 SHEETS—SHEET 3.

Witnesses:
Robert F. Weir
Arthur W. Carlson

Inventor
Guldbrand Guldbrandsen
By Rudolph
Atty.

G. GULDBRANDSEN.
WEIGHING AND RECORDING SCALE.
APPLICATION FILED DEC. 14, 1916.
1,319,217.
Patented Oct. 21, 1919.
5 SHEETS—SHEET 4.
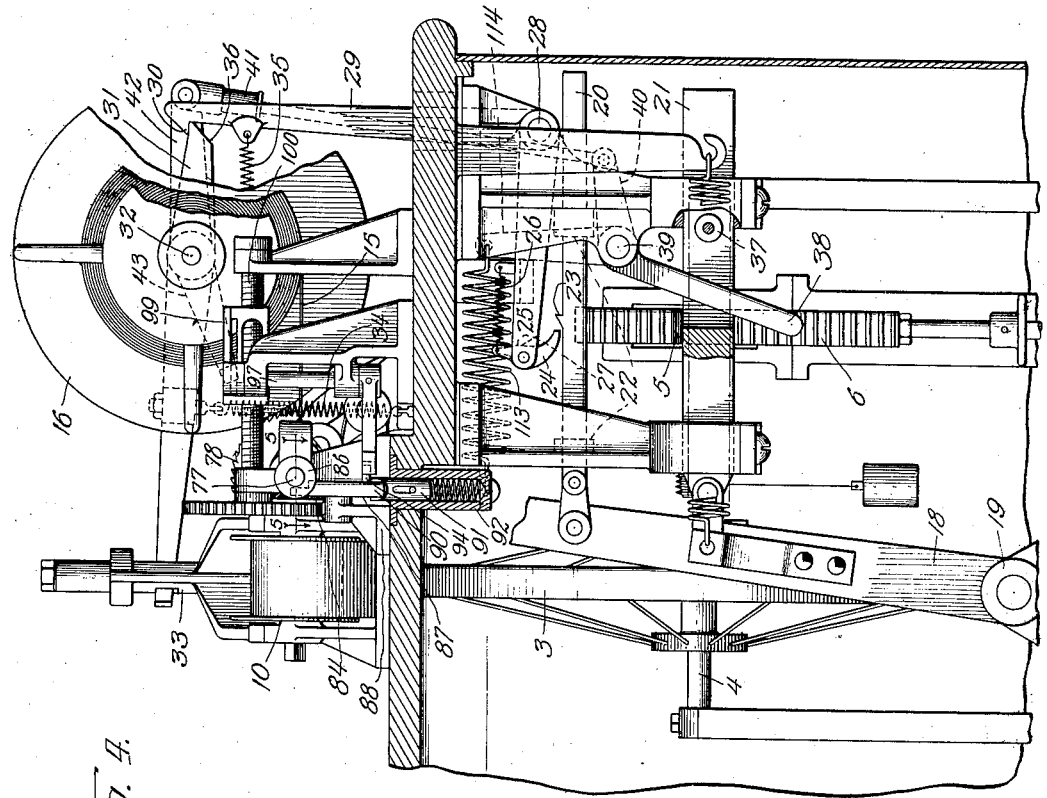
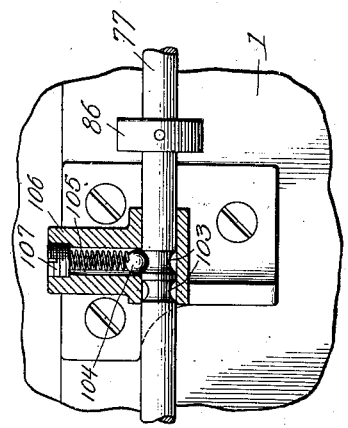

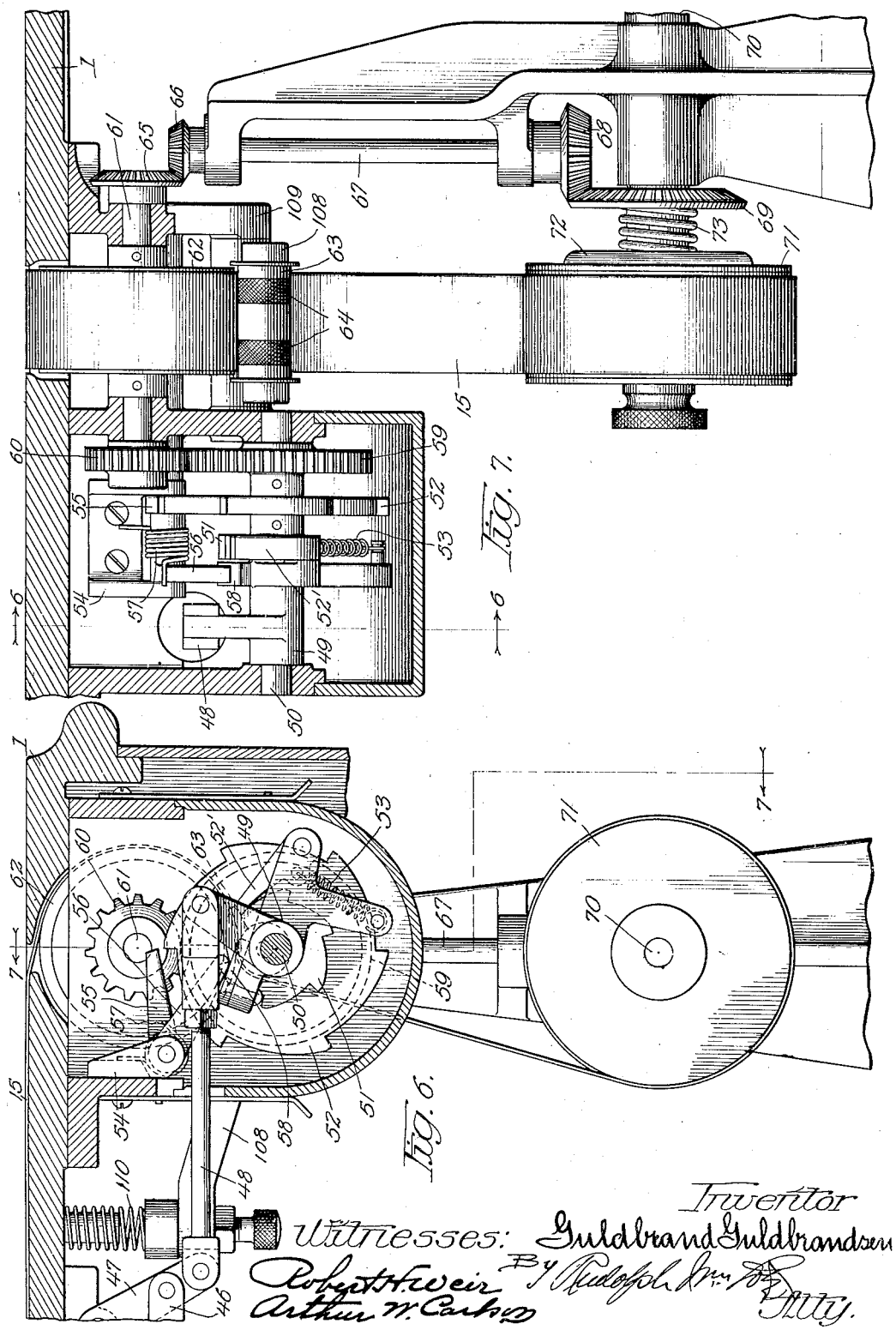

UNITED STATES PATENT OFFICE.

GULDBRAND GULDBRANDSEN, OF CHICAGO, ILLINOIS, ASSIGNOR TO STREETER AMET WEIGHING & RECORDING COMPANY, OF CHICAGO, ILLINOIS, A CORPORATION OF ILLINOIS.

WEIGHING AND RECORDING SCALE.

1,319,217. Specification of Letters Patent. Patented Oct. 21, 1919.

Application filed December 14, 1916. Serial No. 137,040.

*To all whom it may concern:*

Be it known that I, GULDBRAND GULDBRANDSEN, subject of the King of Denmark, residing at Chicago, in the county of Cook and State of Illinois, have invented certain new and useful Improvements in Weighing and Recording Scales; and I do hereby declare the following to be a full, clear, and exact description of the invention, such as will enable others skilled in the art to which it appertains to make and use the same.

This invention relates to improvements in weighing and recording scales, and has for its particular objects to provide manually actuated and controlled mechanism for recording weights of loads on the scale platform and simultaneously resetting the recording mechanism after each operation in readiness for the next succeeding operation.

Particularly stated, the objects of the invention are:

First: To provide weight-recording mechanism adapted to print the weight of a load on the scale platform, on a card or the like, in which the printing is effected by a quick stroke of a printing plunger which is subsequently immediately withdrawn from contact with and pressure upon the face of the printing wheel, and is reset for a second operation during the continuance of the movement of the manually actuated member releasing said plunger to make such printing stroke.

Second: To provide weight-recording mechanism of the character set forth in which a typewriter ribbon, or the like, is employed which is automatically fed a given distance at each operation of the printing mechanism so as to present successively fresh portions of inked surface to effect printing, and to include in the feeding mechanism means for automatically reversing the direction of travel of the ribbon so as to insure legible printing as long as the ribbon contains sufficient ink to produce the same.

Third: To provide weight-recording mechanism of the character set forth in which a paper ribbon is employed to receive successive impressions of weight records, and in which the manually operable mechanism actuates the paper tape-feeding means for spacing successive records from each other.

Other objects of the invention will be understood from the following specification.

The invention consists in the features of construction and combinations of parts hereinafter fully described and particularly claimed.

In the accompanying drawings illustrating a suitable embodiment of the invention:

Figure —1— is a top plan view of the upper plate or table of a recording weighing scale showing the recording mechanism in elevation mounted thereon.

Fig. —2— is a vertical longitudinal section on the line 2—2 of Fig. —1—.

Fig. —3— is a vertical transverse section of the same on the line 3—3 of Fig. —1—.

Fig. —4— is a fragmentary vertical longitudinal section of the same on the line 4—4 of Fig. —1—.

Fig. —5— is a fragmentary detail plan section on the line 5—5 of Fig. 4.

Fig. —6— is a detail vertical section on the line 6—6 of Fig. 7.

Fig. —7— is a detail vertical longitudinal section on the line 7—7 of Fig. 6.

Referring now to said drawings 1 indicates a table suitably mounted upon the frame-work of the weighing scale, and which is provided with an opening 2 through which the printing elements of the device meet. The printing is accomplished by means of the printing-wheel 3 having type on its circumferential face, spaced at regular intervals, and consisting of successive sets of ordinals which indicate the weight on the scale platform when registering a point in vertical alinement with the shaft 4 carrying said wheel 3 and in axial alinement with a printing plunger. The wheel is rotated by means of the spur-pinion 5 on the shaft 4 meshing with the vertically reciprocable rack-bar 6 which is operatively connected with, and actuated by, the movements of the scale-platform under the influence of load imposed thereon.

Suitably mounted to span the opening 2 is a plate 7 provided along its side edges with guides for the typewriter ribbon 9 which is contained on a feed spool and take-up spool 10 and 11 respectively, each of which automatically performs the function of the other, as the direction of rotation of said spools is reversed, as hereinafter more particularly described.

The said ribbon 9 is trained over idle rolls 12 disposed at opposite sides of the plate 7. The latter is provided with a central opening through which the ribbon may be depressed into contact with the surface of the printing wheel 3, by the down-stroke of the printing plunger 33, as hereinafter more fully described. The said plate 7 is further provided with overhanging guide lugs 14 through which the side edge portions of the paper tape 15 for receiving the imprint of the several combinations of ordinals carried on the face of the wheel 3 are successively received. Said tape or ribbon 15 is fed from a suitable reel or spool 16, as hereinafter more fully described. In operation the printing plunger 33 makes a rapid down-stroke so that the printing-head 17 thereof strikes the upper face of the paper tape 15, and depresses the latter upon the typewriter ribbon simultaneously with the depression of the latter forcibly upon the particular combination of ordinals to be printed on the paper tape.

The essence of the invention resides in the provision of manually actuated means for performing successively during a single stroke of a lever, the several operations of effecting a printing stroke of said plunger 33, resetting the latter, moving the typewriter ribbon so as to present a fresh surface of the latter for the next succeeding printing stroke of said plunger, and moving the tape a given distance to present a clean surface for the receiving of the next succeeding imprint thereon.

In addition to performing the aforesaid several functions as described, the invention consists further in associating with the several mechanisms for attaining the aforesaid desired results, mechanism for automatically reversing the direction of travel of the typewriter ribbon as it becomes substantially exhausted from the feed spool, and is taken up by the take-up spool so as to reverse the functions of said spools.

In accomplishing the aforesaid objects I employ a hand-lever 18 which is suitably pivotally secured at its lower end to a projection 19 on the frame of the scale, and is pivotally connected between its ends with a horizontally reciprocable plunger 20 which is more particularly shown in Fig. —4—. Said lever 18 is further pivotally secured between its ends to a second horizontally reciprocable plunger 21, also shown in Fig. —4—, the latter being adapted to perform certain functions independently of, but in synchronism with, the plunger 20 during a single-movement or stroke of said plungers in one direction.

It will be noted that on the upper face of the plunger 20, which is movable longitudinally in suitable guides 22, there is a projection 23 which, as the lever 18 is moved in the direction of the arrow in Fig. —4—, will strike the dog 24 at the outer end of a lever 25. The dog 24 is pivotally mounted on the said lever 25 and is normally held in the position shown in Fig. —4— by the helical tension spring 26 and in contact with a stop 27 which prevents said dog from turning beyond a given point. The lever 25 is rigid with a shaft 28 which also carries an arm 29 provided with a projection 30 at its upper end. The said projection 30 constitutes a latch-stop for one end of a lever 31 pivotally mounted between its ends on the shaft 32, and engaged at its other end in a slot in the printing plunger 33, the latter being vertically reciprocable. The said lever 31 is engaged between its pivot and the end engaged with the plunger 33 with a helical tension spring 34, which is adapted to depress said plunger when the lever 31 is released from engagement with the stop 30.

As said plunger 20 is moved by turning the lever 18, as indicated, the said projection 23 engages the projection 24 thus raising the end of the lever 25 upon which said dog 24 is mounted, thereby imparting a limited rocking movement to the shaft 28 sufficient to turn the arm 29 to release the projection 30 from engagement with the lever 31. The latter is thus tripped and permits the plunger 33 to make its printing stroke under influence of spring 34. The arm 29 is returned to the position indicated in Fig. —4— by means of the helical tension spring 35, so that the beveled upper face of the projection 30 will be disposed in the path of the beveled end 36 of the lever 31. It will be obvious that now, upon returning the lever 31 to the position shown in Fig. —4—, the said beveled edge 36 will engage the beveled face of the projection 30, thus moving the arm 29 against the action of the spring 35, and causing it to return to said position as soon as the upper face of the lever 31 has passed the lower end of the beveled face of said projection 30; whereupon said lever 31 is again latched in the position shown ready to be again tripped to make another printing stroke.

As the movement of the lever 18 is continued in the direction of the arrow of Fig. —4—, the projection 37 moved thereby will strike the lever 38 disposed in its path. The said lever is rigid with a rock-shaft 39, which also carries an arm 40. This is connected by means of the link 41 with one end of a lever 42, also pivotally mounted on the shaft 32, and having its other end 43 extending normally at a downward incline so as to maintain the projection 44 at the outer end thereof out of the path of the lever 31 during the printing stroke of the plunger 33. The said lever 31 is, however, positioned in the path of said projection 44 as the plunger 33 completes its printing stroke so that as the shaft 39 is rocked by engagement of the projection 37 with the lever 38, the said lever 42 will be turned in a direction to cause the projection 44 to return the lever 31 to the position shown in Fig. —4—, whereupon it is relatched, as aforesaid, ready to impart another printing stroke to the plunger 33.

Rigidly mounted on the rock-shaft 39 is another arm 45 which is connected by means of a link 46 with a depending lever-arm 47 carried by the top plate or table of the device. This lever-arm 47 is further connected by means of a link 48 with a rocking carriage 49 loosely mounted on a shaft 50 carrying two ratchet-wheels 51 and 52, respectively, which are of different diameters, but have the same number of equally spaced teeth facing in opposite directions. Pivotally mounted on said carriage 49 is a dog 52' normally held, by means of the tension spring 53, in engagement with the ratchet 51 so that, as said carriage is rocked by the rocking movement imparted to the arm 45 of the rock-shaft 39, said ratchet 51 will be turned through an arc equal to that separating two of its teeth from each other; thereby obviously also rotating the shaft 50 through the same arc. The larger ratchet 52 constitutes only a stop member for limiting the arc of rotation of the shaft 50 at each actuation of the ratchet 51. This is accomplished by means of a rocking-member pivotally mounted in the brackets 54 rigid with the frame of the machine and carrying two integral arms 55 and 56 respectively, which are laterally spaced from each other and also arcuately. A spring 57 engages one of said arms, and holds the same normally in contact, at its free end, with a projection 58 of the rocking carriage 49, which, when the lever is in its normal position, as shown in Fig. —6—, serves to hold the other arm 55 out of engaging relation to the ratchet 52. As soon, however, as the said carriage 49 is rotated in the direction to impart movement to the ratchet 51, the projection 58 of the carriage 49 will move so as to permit a downward movement of the said arm 56, thus permitting the arm 55 to rest upon the surface of the ratchet 52 and in the path of the next succeeding tooth thereof. As the latter strikes the end of the arm 55 the rotation of the shaft 50 is stopped and then, as the carriage 49 returns to its normal position, it will again throw the arm 55 to the position shown in Fig. —6—.

Rigidly mounted on the shaft 50 is a spur gear 59 which meshes with a spur pinion 60 on the shaft 61. The latter carries a drum or pulley 62 over which the paper tape 15 is trained, the latter being also trained over an idle roll or pulley 63, shown in dotted lines in Fig. —6—, and in full lines in Fig. —7—, and which is provided with a frictional surfaced portion 64 for firmly engaging the tape 15 between the same and the opposed surface of the pulley or roll 62. The shaft 61 further carries a bevel-gear 65 meshing with a bevel pinion 66 on a vertical shaft 67. The latter is provided with another bevel gear 68 at its other end which meshes with a bevel gear 69 on a shaft 70 on which a take-up drum 71 for the tape 15 is rotatably mounted. The latter is engaged by a spring-actuated clutch-disk 72 slidable on the shaft 70 but nonrotatable relatively thereto, and which is pressed against a side face of the drum 71 by means of the helical compression spring 73. The said drum 71 is adapted to be rotated at a surface speed exceeding that of the drum or pulley 62, so as to maintain the paper tape 15 under tension, as will be obvious, said drum 71 being incapable of rotating to take up the tape more rapidly than it is fed by the drum or pulley 62 by reason of the slippage permitted by the spring-held clutch member 72.

It will thus be seen that during each movement of the lever 18 in the direction of the aforesaid arrow the paper will be fed a predetermined distance so as to space the records of weights from each other.

There is also mounted on the rock-shaft 39 another arm 74 which is connected by means of the link 75 with the lower end of a lever 76, pivotally suspended from the shaft 77. Rigid with the latter is a ratchet wheel 78 adapted to be engaged by the spring-held pawl 79 pivotally mounted on the lever 76 between its ends, so that at each aforesaid stroke of the lever 18 said ratchet will be rotated through a predetermined arc. The said ratchet 78 is slidably mounted on the shaft 77, but is nonrotatable relatively thereto. The shaft 77 carries two oppositely disposed spur pinions 80 and 81 respectively, the former meshing with a bevel gear 82 on the shaft of a ribbon take-up drum for the ribbon 9 which travels transversely of the tape 15. The bevel pinion 81 is adapted to mesh with the bevel pinion 84 of the ribbon spool 10 which is, in the position of the parts shown in Fig. —1—, the feed spool, but is adapted to become the take-up spool, alternately with the said reel or spool 11. At the end of the shaft 77 opposite that carrying the ratchet 78 is a pair of collars 86 which are adapted to be alternately engaged by the end of a lever 87 pivotally mounted between its ends in brackets 88 on the table of the machine. The lower end of said lever 87 terminates in a sharp point 89 formed by converging cam surfaces 90 which are adapted to be engaged alternately by the spring-held plunger 91 reciprocable in a socket 92 projecting through the table of the machine. The upper end of said plunger 91 is provided with convergent surfaces 93 engaging respectively the converging surfaces of the lever 87, and is adapted, as said lever is rocked and passes the vertical axis of said plunger 92, to forcibly throw said lever over in a well-known manner to suddenly shift the gears 80 and 81 to throw the former out of mesh with the gear 82 and the latter into mesh with the gear 84.

The said lower end of said lever 87 carries a projecting pin 94, which extends into the recess 95, in the forked end of a lever 96 mounted on a vertical pivot or shaft 97. Rigid with respect to the said arm or lever 96 is a transversely extending arm 98 which engages in the longitudinal slot of a carriage 99 mounted upon a horizontal screw-shaft 100, and which is adapted to be reciprocated as said screw-shaft is rotated in respectively opposite directions.

Rigidly mounted on said shaft 100 is a spur gear 101 which meshes with a spur pinion 102 rigid with the bevel gear 84 so that as the latter is rotated said gear will also be rotated, thus rotating the screw-shaft 100 to reciprocate said carriage 99 and rocking the arm 96 in accordance with such movements to throw the lever 87 as aforesaid for the purpose of reversing the direction of travel of the ribbon 9. The said gear 101 and shaft 100 will be rotated by the gearing with the shaft 77, when the spool 11 becomes a take-up spool and in the opposite direction by the unwinding of the ribbon from the same when it becomes a feed-spool, as shown in Fig. —1—.

From the foregoing it will be apparent that a single stroke of the lever 18 in the direction of the arrow accomplishes the several results and functions herein fully described.

In order that the shaft 77 may be firmly held in either of the two positions to which it is shifted by the lever 87, I have provided in said shaft, as shown in Fig. —5—, a pair of annular grooves 103, each of which is adapted to alternately receive the ball or sphere 104 which is held compressed against said shaft 77 by means of the compression spring 105, mounted in the socket 106 and bearing against the screw-plug 107. As the shaft 77 is moved longitudinally the ball or sphere 104 will ride over the ridge separating the grooves 103, and will thus serve to resist accidental longitudinal movement of said shaft such as would disengage either of the bevel pinions 80 or 81 from its companion gear 82 or 84, respectively.

The roller 63 is mounted in the bifurcated end of a lever 108, pivotally mounted between its ends on a projection 109 of the machine frame, and is held in close surface contact with the roll or pulley 62 by means of the helical compression spring 110 bearing upon the outer end of said lever 108.

After the plunger 20 has completed its operating stroke it returns to its normal position, this being accomplished by the spring 113 engaged with the lever 114. During the return stroke of said plunger 20 the projection 23 thereon will, in passing the dog 24, turn the latter on its pivot against the action of the light spring 26 without actuating the lever 25.

The operation of the machine will be fully understood from the foregoing description without necessitating a résumé of the same.

While I have shown the preferred embodiment of the invention in the accompanying drawings, it will be obvious, of course, that such changes in structure may be made as mechanical skill and adaptation to particular needs may require without departing from the invention as defined in the appended claims.

I claim as my invention:

1. In a recording weighing scale, the combination with a printing-wheel adapted to be actuated by the movements of the scale-platform to indicate the load on the latter, a printing plunger opposing the point at which the weight-indicating numeral appears, an inked ribbon or the like and a paper-tape interposed between the wheel and plunger, trip mechanism maintaining the plunger normally at the outer limit of its movement radially of the wheel against the action of a spring, plunger resetting mechanism associated with said trip mechanism for resetting the plunger after each printing stroke, and a lever common to both said parts adapted during movement in one direction to actuate said trip-mechanism to release the plunger and subsequently actuate the resetting mechanism to return the plunger to its normal position.

2. In a recording weighing scale, opposed normally separated printing elements including a typewheel adapted to be set by movement of the scale-platform under the influence of load to indicate the weight of the latter, means for supporting paper and a color-bearing element between said printing elements, a spring operatively associated with the latter for causing them to approach each other to produce a record on the interposed paper, a trip-mechanism for maintaining said elements separated against the action of said spring, a resetting mechanism associated with said trip-mechanism for returning said printing elements to normal position, and a single operating lever common to both said mechanisms for actuating the same successively during a movement of said lever in one direction.

3. In a recording weighing scale, opposed normally separated printing elements including a typewheel adapted to be set by movement of the scale-platform under the influence of load to indicate the weight of the latter, means for supporting paper and a color-bearing element between said printing elements, a spring operatively associated with the latter for causing them to approach each other to produce a record on the interposed paper, a trip-mechanism for maintaining said elements separated against the action of said spring, a resetting mechanism associated with said trip-mechanism for returning said printing elements to normal position, mechanism for moving said color-bearing element after each printing stroke of said printing elements for presenting a fresh color surface to the action thereof, and a single lever common to all of said mechanisms for actuating the same successively during a movement of said lever in one direction.

4. In a recording weighing scale, opposed normally separated printing elements including a typewheel adapted to be set by movement of the scale-platform under the influence of load to indicate the weight of the latter, means for supporting paper and a color-bearing element between said printing elements, a spring operatively associated with the latter for causing them to approach each other to produce a record on the interposed paper, a trip-mechanism for maintaining said elements separated against the action of said spring, a resetting mechanism associated with said trip-mechanism for returning said printing elements to normal position, mechanism for moving said color-bearing element after each printing stroke of said printing elements for presenting a fresh color surface to the action thereof, mechanism for shifting said paper to present a fresh imprint-receiving surface after each printing stroke of said printing elements, and a single lever common to all of said mechanisms for actuating the same successively during a movement of said lever.

5. In a recording weighing scale, opposed normally separated printing elements including a typewheel adapted to be set by movement of the scale-platform under the influence of load to indicate the weight of the latter, a traveling color-bearing tape interposed between said printing elements, means for supporting a record-receiving element between the tape and the tympan member of said printing elements, mechanism for shifting said tape after each actuating of said printing elements to record the weight of a load, and a single hand-lever operatively associated with said printing elements and said tape-shifting mechanism for effecting a printing operation of and resetting said printing elements, and shifting said tape during a single movement of said lever in one direction, the last-named operations succeeding the first-named.

6. In a recording weighing scale, opposed normally separated printing elements including a typewheel adapted to be set by movement of the scale-platform under the influence of load to indicate the weight of the latter, a traveling color-bearing tape interposed between said printing elements, means for supporting a record-receiving element between the tape and the tympan member of said printing elements, mechanism for moving said tape in one direction after each printing operation of said printing elements, mechanism for automatically reversing the direction of movement of said tape at intervals, and a single hand-lever operatively associated with said printing elements and said tape-shifting mechanism for effecting a printing operation of and resetting said printing elements and shifting said tape during a single movement of said lever, the last-named operations succeeding the first-named.

7. In a recording weighing scale, a printing plunger, a spring for imparting a printing stroke thereto, a trip-mechanism adapted to support said plunger against the action of said spring, a lever for raising said plunger against the action of said spring, a spring for automatically operatively engaging said trip mechanism with said plunger for holding the latter in its raised position, and an operating lever for actuating said trip mechanism to release said plunger and subsequently actuating said lever for resetting said plunger upon a single movement of the operating lever in one direction.

8. In a recording weighing scale, opposed normally separated printing elements including a typewheel adapted to be set by movement of the scale-platform under the influence of load to indicate the weight of the latter, means for supporting paper and an inked ribbon between said printing elements, a spring-held lever engaged with one of said printing elements, a spring-held trip-lever adapted to normally engage said spring-held lever to support the same against the action of its spring, a resetting lever adapted to engage said spring-held lever to move the same against the action of its spring, and an operating lever operatively associated with said trip lever and said resetting lever to actuate the same successively upon a single movement of the operating lever in one direction.

In testimony whereof I have signed my name in presence of two subscribing witnesses.

GULDBRAND GULDBRANDSEN.

Witnesses:
G. L. O'DONNELL,
D. BECKER.